(12) United States Patent
Tobias

(10) Patent No.: US 9,329,643 B2
(45) Date of Patent: May 3, 2016

(54) APPARATUS FOR HOLDING A SEMICONDUCTOR MODULE

(71) Applicant: Michael R. Tobias, Dexter, MI (US)

(72) Inventor: Michael R. Tobias, Dexter, MI (US)

( * ) Notice: Subject to any disclaimer, the term of this patent is extended or adjusted under 35 U.S.C. 154(b) by 40 days.

(21) Appl. No.: 14/305,737

(22) Filed: Jun. 16, 2014

(65) Prior Publication Data

US 2014/0368988 A1     Dec. 18, 2014

Related U.S. Application Data

(60) Provisional application No. 61/835,691, filed on Jun. 17, 2013.

(51) Int. Cl.
*G06F 1/18*    (2006.01)
*G06F 1/20*    (2006.01)

(52) U.S. Cl.
CPC . *G06F 1/183* (2013.01); *G06F 1/20* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,492,481 A | * | 2/1996 | Lewis | H01R 23/68 361/754 |
| 5,759,057 A | * | 6/1998 | Cheng | H01R 12/7005 439/325 |
| 6,126,472 A | * | 10/2000 | Choy | H01R 12/83 439/328 |
| 6,176,727 B1 | | 1/2001 | Liu et al. | |
| 6,353,541 B1 | * | 3/2002 | Leman | G06F 1/183 211/41.17 |
| 6,424,527 B1 | * | 7/2002 | Bailey | G06F 1/183 174/16.3 |
| 6,517,369 B1 | * | 2/2003 | Butterbaugh | H01R 12/707 439/327 |
| 6,529,386 B2 | * | 3/2003 | Boe | H05K 7/1431 24/563 |
| 6,540,540 B1 | * | 4/2003 | Tobey | H01R 12/83 439/157 |
| 6,585,534 B2 | | 7/2003 | Llapitan et al. | |
| 6,619,973 B2 | | 9/2003 | Perino et al. | |
| 6,731,517 B1 | * | 5/2004 | Yu | H01R 12/7011 361/758 |
| 7,303,412 B1 | | 12/2007 | Liao | |
| 7,371,097 B1 | | 5/2008 | Pennypacker et al. | |
| 8,351,205 B2 | * | 1/2013 | Tang | F04D 25/0613 361/679.48 |
| 8,422,226 B2 | * | 4/2013 | Ye | G06F 1/20 361/695 |
| 8,743,562 B2 | * | 6/2014 | Hartman | H01R 13/62905 361/679.02 |
| 2006/0234541 A1 | | 10/2006 | Graham et al. | |

FOREIGN PATENT DOCUMENTS

| | | |
|---|---|---|
| KR | 1020050033013 | 8/2005 |
| WO | WO 2012/110849 | 8/2012 |

* cited by examiner

*Primary Examiner* — Lisa Lea Edmonds
(74) *Attorney, Agent, or Firm* — Vincent Re PLLC

(57) ABSTRACT

A memory module attaches as a component to a printed circuit board. An apparatus is disclosed for securing a memory module to a memory module socket. The apparatus includes a bracket device securely holding the memory module against the memory module socket. The memory module cannot disengage from the memory module socket without first removing the bracket.

20 Claims, 10 Drawing Sheets

APPARATUS FOR HOLDING A SEMICONDUCTOR MODULE

CROSS REFERENCE TO RELATED APPLICATIONS

This disclosure claims the benefit of U.S. Provisional Application No. 61/835,691 filed on Jun. 17, 2013 which is hereby incorporated by reference.

TECHNICAL FIELD

The present disclosure relates to SODIMM memory modules. The disclosure particularly relates to a device for securing SODIMM memory modules in high shock and vibration environments while inserted into a SODIMM socket. The device can additionally provide an improved method of cooling the memory module.

BACKGROUND

The statements in this section merely provide background information related to the present disclosure. Accordingly, such statements are not intended to constitute an admission of prior art.

SODIMM memory modules are used throughout the computer industry in various applications. The most prevalent application would be in laptop computers. The current industry standard method of connecting and securing SODIMM modules is by way of the standard SODIMM sockets. There are applications where these modules are excluded because they do not meet high shock and vibrations requirements when used with SODIMM sockets. For that reason the majority of harsh industrial and military applications has declared the standard SODIMM socket to be unacceptable and will not allow them to be used in those types of applications. In those applications the industry requires that the individual memory chips must be soldered directly to the main PCB board to meet the shock and vibration specifications set forth by those perspective industries.

Standard SODIMM sockets incorporate a form of a spring clip to secure the device in the socket. It has been proven that the current method will not pass the requirements of high shock and vibration applications.

SUMMARY

A memory module attaches as a component to a printed circuit board. An apparatus is disclosed for securing a memory module to a memory module socket. The apparatus includes a bracket device securely holding the memory module against the memory module socket. The memory module cannot disengage from the memory module socket without first removing the bracket.

BRIEF DESCRIPTION OF THE DRAWINGS

One or more embodiments will now be described, by way of example, with reference to the accompanying drawings, in which:

FIG. 16 illustrates a first set of screws fastening a first bracket device to a PCB and a second set of screws fastening a second bracket device to the first bracket device;

FIG. 17 illustrates an exemplary adhesive affixing a bracket device to a PCB;

FIG. 18 illustrates an exemplary set of rivets affixing a bracket device to a PCB; and FIG. 19 illustrates an exemplary set of vibration weld joints securing a bracket device constructed of a polymer to a PCB.

DETAILED DESCRIPTION

Figure 1:
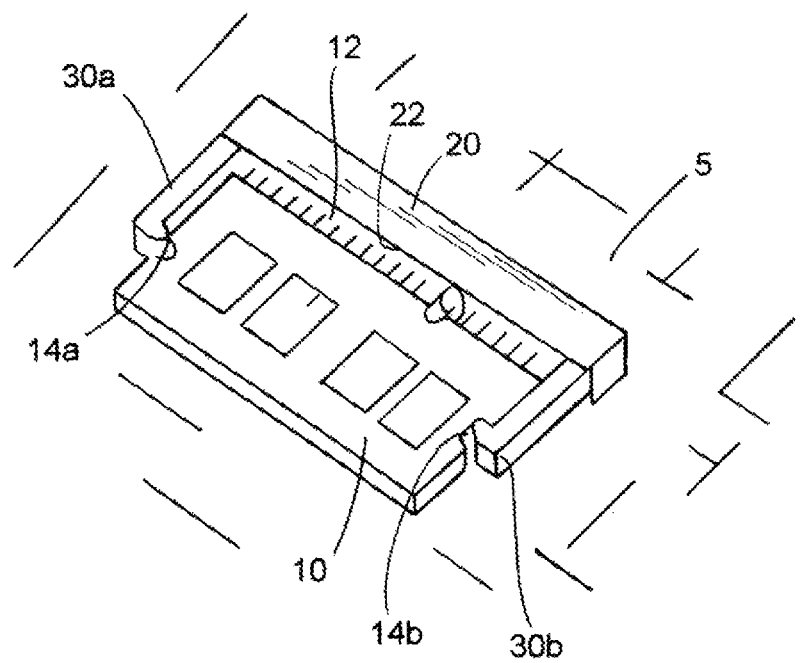
FIG. 1 illustrates a typical memory module socket that is standard in the industry, in accordance with the present disclosure.

The present disclosure resolves the issues of using memory modules such as small outline dual in-line memory modules (SODIMM) in high shock and vibration environments. Devices securing modules to boards are known to include spring clips that permit manual retention. A user pressing a finger against the module or against a spring clip can cause the known securing device to release the memory module.

A securing bracket device is disclosed, wherein the device includes a bracket that securely holds the module to a surface and wherein the device is fastened to the surface. Exemplary configurations include fasteners, rivets, adhesive, or thermally activated joints affixing the bracket in place. The disclosed securing bracket device firmly holds the memory module against and electronically engaged to the corresponding memory socket until or unless the bracket is first removed. The disclosed securing device also allows for a lower cost, higher quality, and improved serviceability.

SODIMM modules and sockets will be disclosed for use with the disclosed securing device. It will be appreciated that the devices disclosed herein can be used with other types of memory modules or other modularly attachable computer components within a computerized unit, and the disclosure is intended to cover any and all similar connections of components to a computerized unit.

SODIMMs are mass produced and used in high volume and hence are less costly. The alternative of buying and soldering down memory chips directly on the main printed circuit board (PCB) is very costly along with other unwanted side effects. Allowing SODIMM sockets to be used will remove a considerable amount of design time from the main board design, speeding up time to market. SODIMM memory modules have the majority of the high-speed memory design requirements already incorporated into the module. The specific timing requirements for the memory modules themselves on the SODIMM are stored on a device that is also present on the module freeing the design engineer from dealing with timing issues on the main PCB. The timing requirements of the memory are simply read from the device on the SODIMM module by the CPU (Central Processing Unit).

The use of secured but modularly replaceable SODIMMS as disclosed herein frees the user from having to pick the correct amount of memory at time of order. Such modular installation allows for the ease of future upgrades. Soldered down memory chips cannot be changed where SODIMM modules can be exchanged for higher capacity SODIMM modules.

Issues caused by the discontinuation or end-of-life of a particular memory device are greatly reduced. Standard memory chips are frequently discontinued, challenging the designer to find new chips or to redesign the main board to accommodate newer chips, if the memory chips have been soldered directly to the main PCB. By allowing the use of standard SODIMM modules in high shock and vibration environments, the designer simply finds a similar, compatible SODIMM module and plugs it in.

Another benefit of the disclosed device is space savings. Space on a PCB is extremely valuable in most applications. SODIMM modules in a stacked configuration as disclosed herein can save board space in high shock and vibration applications that previously required the memory chips to be spread out and soldered to the PCB.

An additional benefit of the disclosure relates to cooling of the SODIMM modules(s). The disclosed device along with the use of TIM (Temperature Interface Material) the module is more secure as well as conducting heat away from the memory chips on the modules. Heat spreaders have long been known in the industry to help cool the module but current designs with heat spreaders still use the clips included with the sockets to secure the device. One embodiment of the disclosure provides a method of holding the SODIMM and also provides a heat path for all the memory chips on the modules to be spread and conducted into the copper planes within the PCB.

The disclosed securing device solves the issues of using memory modules also referred to as SODIMM modules with the use of standard memory sockets in high shock and vibration applications. The disclosed device includes a module-securing bracket that restricts movement of the memory module in all three axis X, Y, and Z. The disclosed device also provides a means to which the modules can be conduction cooled. Memory modules are designed to meet industry standard specifications like JEDEC MO-268. The disclosed device is designed to comply with those standards by providing a method to secure and cool the modules that typical memory sockets do not provide.

Referring now to the drawings, wherein the showings are for the purpose of illustrating certain exemplary embodiments only and not for the purpose of limiting the same, FIG. 1 illustrates a typical memory module socket that is standard in the industry. Memory socket 20 is illustrated attached to PCB 5. Memory socket 20 includes spring clips 30a and 30b integrally attached to the memory socket and including features configured to securely hold locator cut-outs 14a and 14b on either side of a matching memory module. Memory module 10 is illustrated, with connector region 12 plugged into connector slot 22 of socket 20. Socket 20 firmly grips connector region 12 of module 10 when the module is fully engaged and the module is held in line with spring clips 30a and 30b and snuggly pushed against socket 20. However, spring clips 30a and 30b, which snuggly pushes module 10 against socket 20 when the spring clip features are engaged to locator cut-outs 14a and 14b, are specifically configured to easily release module 10 when a user depresses one of the spring clips.

Such an easily releasable configuration can be acceptable in a laptop or other commercial/consumer application. Most people guard against dropping a laptop, and if they do, any resulting loss of connection between a SODIMM module and its socket is an easily recoverable condition. Such a risk is widely accepted in the consumer world. However, in military and industrial applications, loss of memory chip function can be catastrophic. For example, a tank in combat includes many electronic systems and modules, for example, for maneuvering the vehicle, for controlling the turret, for communicating, and for identifying and tracking targets. If the tank is struck by an enemy shell or if the tank collides with a barrier, the resulting mechanical shock to the tank could cause a standard SODIMM socket to release its memory module, thereby causing an unacceptable system crash. Similarly, a crane lifting multi-ton logs on a worksite depends upon computerized systems to maneuver, to control a lifting arm, and to communicate with workers around the crane. If vibration causes a memory module to be released from the associated SODIMM socket, the user could lose control of the crane and the logs being lifted.

Figure 2:
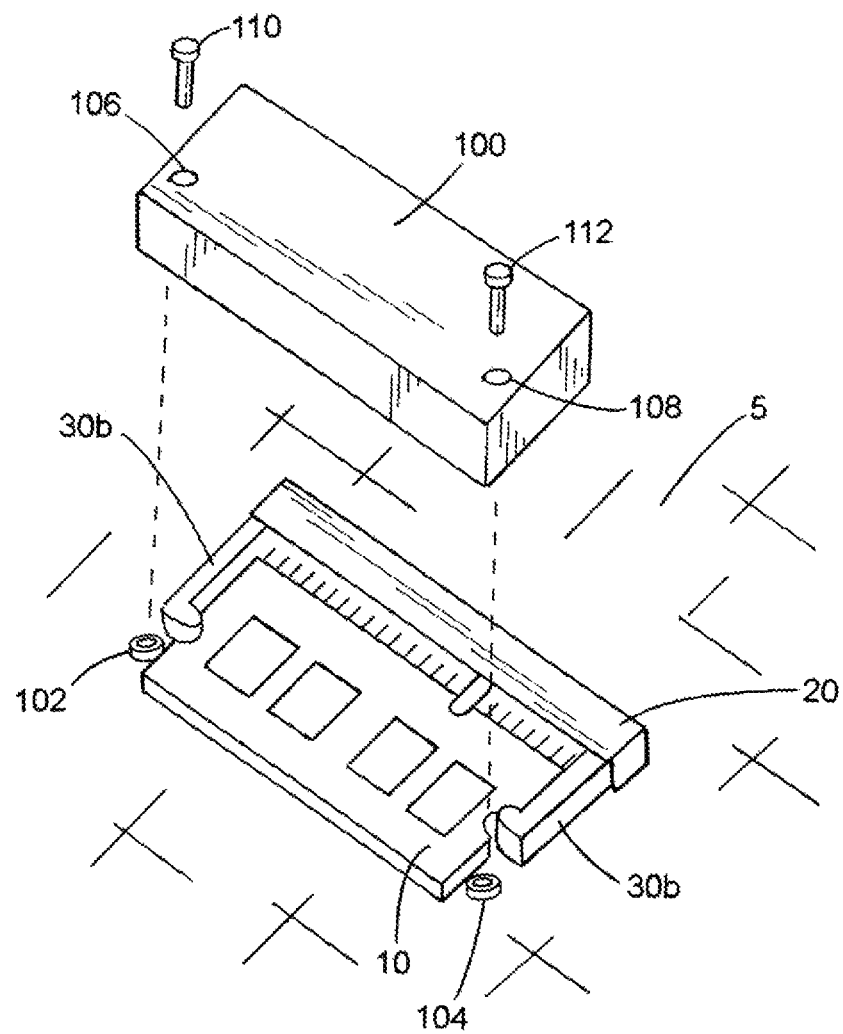
FIG. 2 illustrates an exemplary securing device installed to a memory socket and memory module, the securing device preventing the memory module from accidentally disengaging from the memory socket, in accordance with the present disclosure.

FIG. 2 illustrates an exemplary securing device installed to a memory socket and memory module, the securing device preventing the memory module from accidentally disengaging from the memory socket. Memory socket 20 is illustrated attached to PCB 5. Memory socket 20 includes spring clips 30a and 30b integrally attached to the memory socket and including features configured to securely hold locator cut-outs on either side memory module 10. Securing device 100 is illustrated in location to be lowered upon module 10 and securingly hold module 10 against socket 20. Device 100 includes holes 106 and 108 which line up with holes 102 and 104, respectively, on PCB 5, such that fasteners 110 and 112 can be used to securely affix device 100 to PCB 5. Device 100 includes features to prevent module 10 from moving away from socket 20. Device 100 can include features to secure spring clips 30*a* and 30*b* such that the clips cannot be activated to release the module 10 when the device is affixed to the PCB 5.

Figure 3:
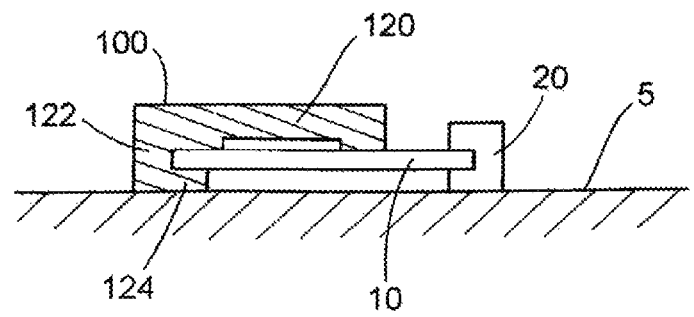
FIG. 3 illustrates in cross-section the components of FIG. 2, in accordance with the present disclosure.

FIG. 3 illustrates in cross-section the components of FIG. 2. Device 100 is illustrated attached to PCB 5 and holding module 10 against socket 20. Device 100 includes a portion 120 that covers a top side of module 10 and prevents movement of module 10 away from PCB 5. Device 100 includes portion 124 which acts as a spacer between module 10 and PCB 5, preventing the module from moving closer to the PCB. Device 10 includes portion 122 which prevents module 10 from moving away from socket 20. Socket 20 prevents module 10 from moving to one side or the other of socket 20 (in the direction of the viewer or away from the direction of the viewer in FIG. 3) so long as module 10 is engaged to socket 20, but device 100 can include further features to prevent side-wards movement of module 10.

Figure 4:
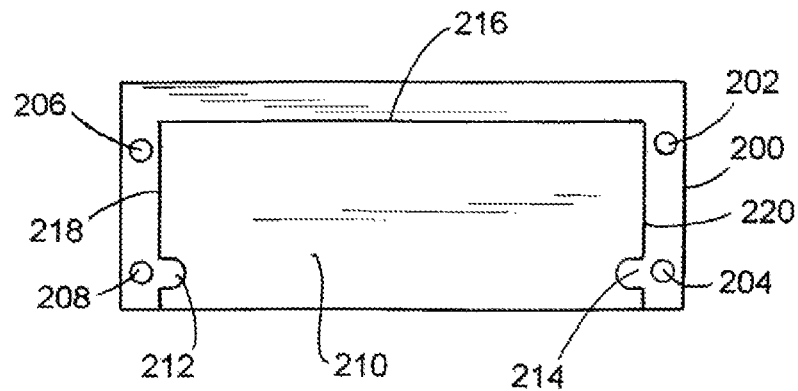
FIG. 4 illustrates an alternative embodiment of a securing device including tabs for securing to locator cut-outs on either side of a memory module, in accordance with the present disclosure.

FIG. 4 illustrates an alternative embodiment of a securing device including tabs for securing to locator cut-outs on either side of a memory module. If a socket is utilized that does not include spring clips, features can be added to a securing device to grip a memory module by its locator cut-outs. Securing device 200 is illustrated including cavity 210 for holding a memory module. Walls 216, 218, and 220 are configured to a particular size of memory module and abut securely to the sides of the module. Features 212 and 214 are configured to fit into locator cut-outs for the module. Holes 202, 204, 206, and 208 are provided to affix device 200 to a PCB.

Figure 5:
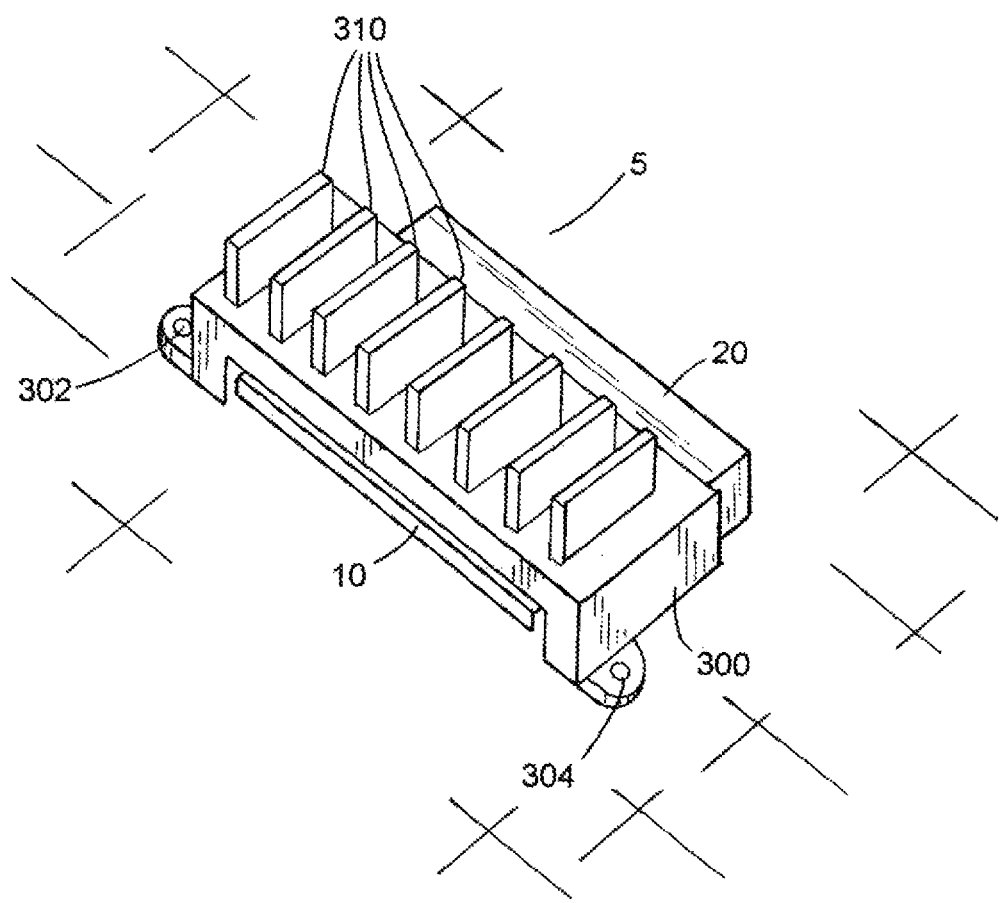
FIG. 5 illustrates an additional alternative embodiment of a securing device including heat dissipation fins, in accordance with the present disclosure.

FIG. 5 illustrates an additional alternative embodiment of a securing device including heat dissipation fins. Securing device 300 is illustrated attached to PCB 5 and securely holding module 10 to socket 20. Holes 302 and 304 are illustrated to securely affix device 300 to PCB 5. Memory chips and the associated module generate heat, and methods to transfer heat away from a memory module can be beneficial. Device 300 can be constructed of any material known for use in computers. Materials can be used such as copper or aluminum that are conductive to heat and that will transfer heat away from the module. Fins 310 are illustrated increasing a surface area of device 300 to improve heat conduction from device 300 into surrounding air.

Figure 6:
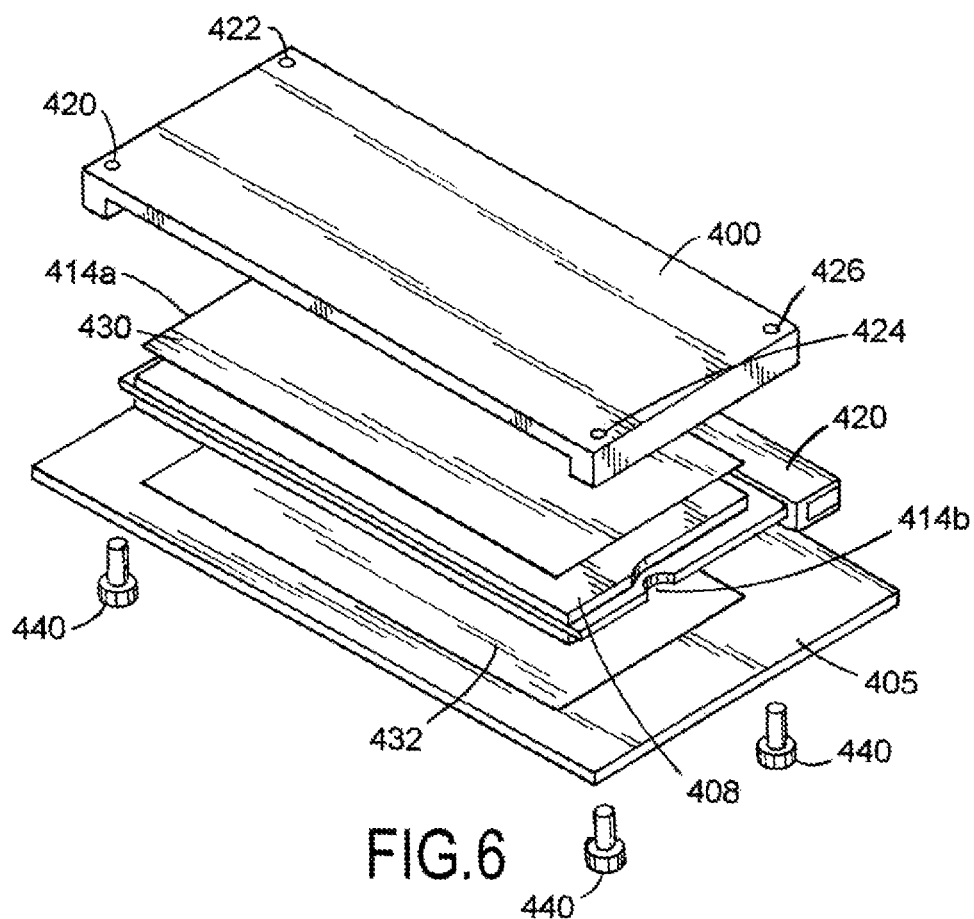
FIG. 6 illustrates an additional alternative embodiment of a securing device in combination with layers of TIM, in accordance with the present disclosure.

FIG. 6 illustrates an additional alternative embodiment of a securing device in combination with layers of TIM material. Socket 420 is illustrated holding an alternative memory module 408. Sheets 430 and 432 of TIM material are illustrated provided between module 408 and securing device 400 and between module 408 and substrate surface 405, respectively. The TIM material is known in the art for improving heat transfer between two surfaces. Further, the TIM material can be used to take up space between layers such as between the module and PCB. By taking up this space, the module is less likely to move relative to the memory socket and the PCB and instead will tend to move in unison with the PCB. Device 400 includes features for holding locator cut-outs 414*a* and 414*b* of module 408, and device 400 includes holes 420, 422, 424, and 426 to receive fasteners 440 which are installed from a bottom side of substrate 405.

Figure 7:
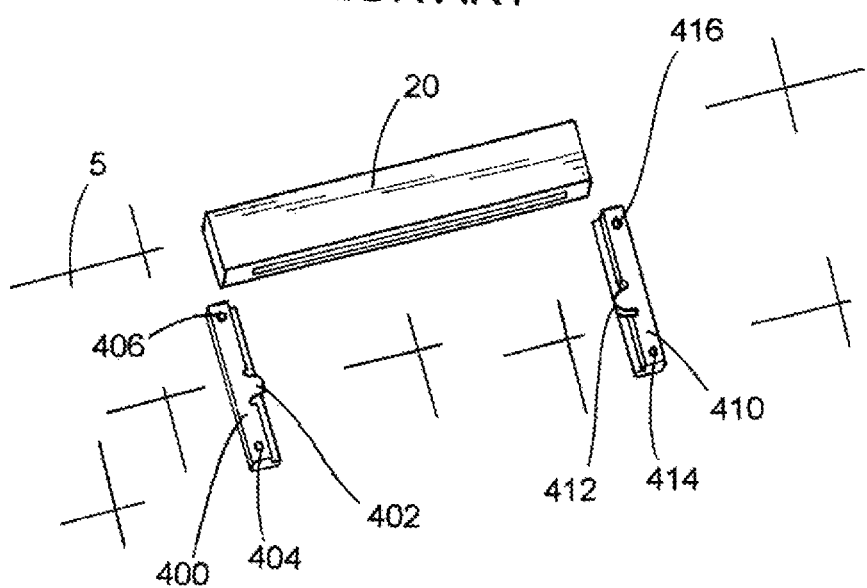
FIG. 7 illustrates an additional alternative embodiment of a securing device including a pair of side brackets, in accordance with the present disclosure.

FIG. 7 illustrates an additional alternative embodiment of a securing device including a pair of side brackets. Socket 20 is illustrated attached to PCB 5. Brackets 400 and 410 are shown in approximate locations to affix a memory module to socket 20, each bracket affixing to a short side of the memory module, with the brackets 400 and 410 flipped over to reveal details of the brackets. Features 402 and 412 are provided to hold locator cut-outs on a module. Holes 404, 406, 414, and 416 are provided to attach the brackets to PCB 5. When installed, both brackets 400 and 410 would be flipped over with features 402 and 412 pointing down toward the PCB and pointing inward toward each other. As disclosed in relation to FIG. 6, TIM material can be used between the PCB and the module to dissipate heat and take up the space between the PCB and the module.

Figure 8:
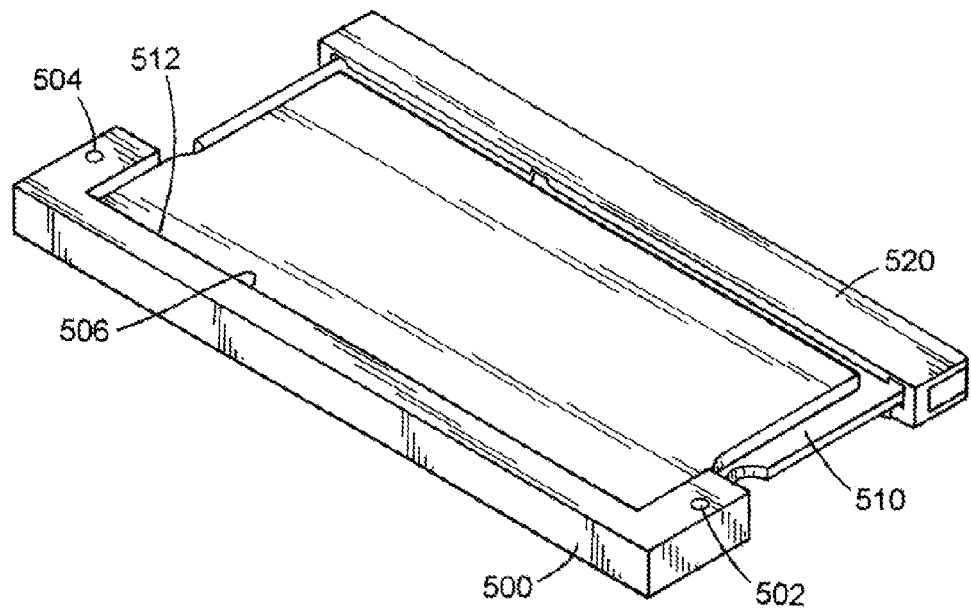
FIG. 8 illustrates an additional alternate embodiment of a securing device including a slotted frame bracket and leaving spring clips off of the memory socket, in accordance with the present disclosure.

FIG. 8 illustrates an additional alternate embodiment of a securing device including a slotted frame bracket and leaving spring clips off of the memory socket. Socket 520 without any spring clips installed thereto and memory module 510 are illustrated. A securing device embodied as slotted frame bracket 500 is illustrated snuggly holding module 510 against socket 20. Bracket 500 includes a flat wall surface 506 configured to match an end 512 of module 510. SODIMM modules have areas that can be contacted by a bracket and other areas that cannot due to electronic features on the module. According to one embodiment of SODIMM modules, the end of module 510 adjacent to surface 506 cannot be contacted on top or bottom surfaces by the bracket 500. By presenting surface 506 against the narrow end surface of module 510, the bracket can retain the module 510 against the socket 20 without violating the rules against contacting the module on the top or bottom of the module. Bracket 500 includes holes 502 and 504 for holding the bracket to the PCB. While holes and fasteners are illustrated as easy ways to affix a securing device to a PCB or other substrate, it will be appreciated that any mechanical system for securing the device can be utilized.

Figure 9:
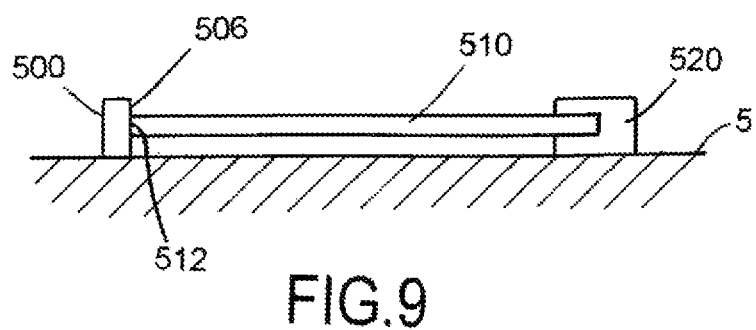
FIG. 9 illustrates in cross-section the components of FIG. 8, in accordance with the present disclosure.

FIG. 9 illustrates in cross-section the components of FIG. 8. Device 500 and socket 520 are illustrated affixed to PCB 5. Device 500 includes flat wall surface 506 abutting end 512 of module 510. Device 500 and socket 520 securely hold module 510 from all sides and prevent any movement of the module relative to PCB 5. By locating a flat wall to an end of the memory module distal to the connection to the socket, the bracket device can prevent the memory module from accidentally disengaging from the socket.

Figure 10:
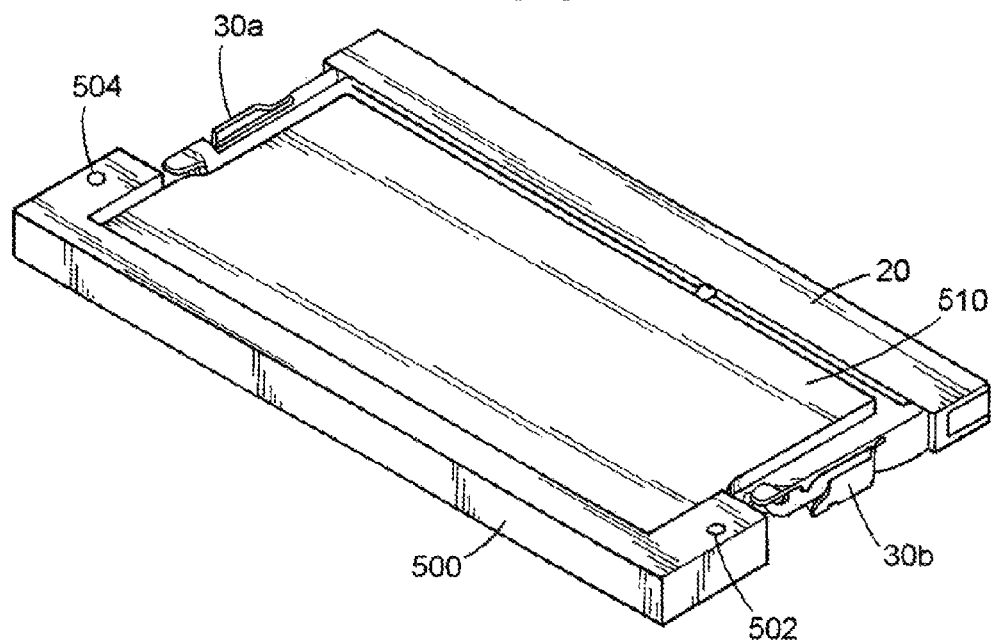
FIG. 10 illustrates the securing device of FIG. 8 with a different memory socket maintaining spring clips, in accordance with the present disclosure.

FIG. 10 illustrates the securing device of FIG. 8 with a different memory socket maintaining spring clips. Socket 20 with spring clips 30*a* and 30*b* installed thereto and memory module 510 are illustrated. Slotted frame bracket 500 is illustrated snuggly holding module 510 against socket 20. Bracket 500 includes holes 502 and 504 for holding the bracket to the PCB. A securing device such as bracket 500 can be configured for use with sockets with or without spring clips installed to the socket.

Figure 11:
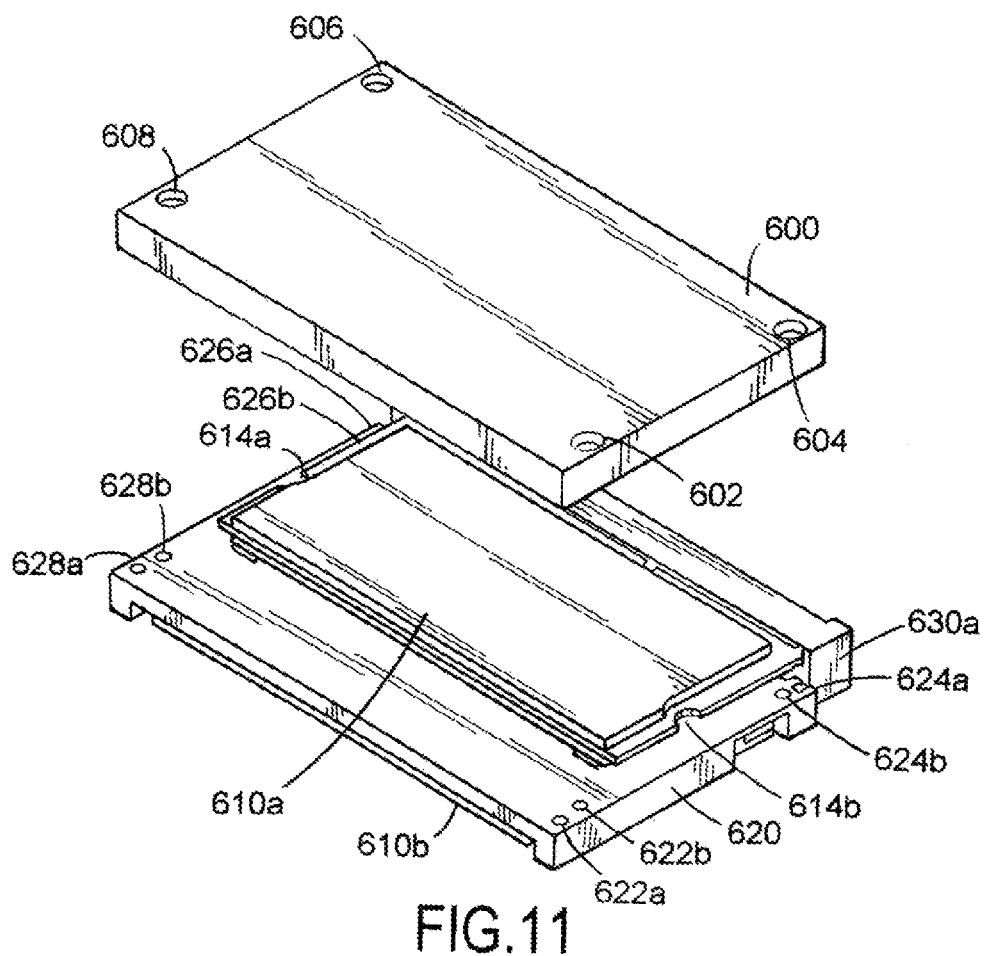
FIG. 11 illustrates an alternative memory socket configuration including a first memory module and memory socket and a second memory module and memory socket, in accordance with the present disclosure.

FIG. 11 illustrates an alternative memory socket configuration including a first memory module and memory socket and a second memory module and memory socket. Stacked socket configurations are known for providing augmented memory capacity to a computerized device while limiting space used on the PCB. Socket 630*a* is illustrated to engage a first memory module 610*a*, and a second socket engages illustrated second memory module 610*b*. Securing devices 600 and 620 are illustrated for holding modules 610*a* and 610*b*, respectively, against their respective sockets. Device 600 includes features for securely holding locator cut-outs 614*a* and 614*b* of module 610*a*. Device 620 similarly includes features for securely holding module 610*b*. Device 620 includes holes 622*a*, 624*a*, 626*a*, and 628*a* such that fasteners can hold the device to the PCB. Device 600 includes holes 602, 604, 606, and 608 such that fasteners can hold the device to the PCB. Device 620 includes holes 622*b*, 624*b*, 626*b*, and 628*b* such that the fasteners holding down device 600 can pass through device 620. In another embodiment, screws on an opposite side of the PCB could pass through open holes on the PCB and engage to threaded holes on device 620 to hold device 620 to the PCB, and other screws could pass through open holes on device 600 and engage to threaded holes on device 620 to hold device 600 to device 620. A number of methods to affix bracket devices as disclosed herein to a PCB, a substrate, or to another device are envisioned, and the disclosure is not intended to be limited to the particular examples provided herein.

Figure 12:
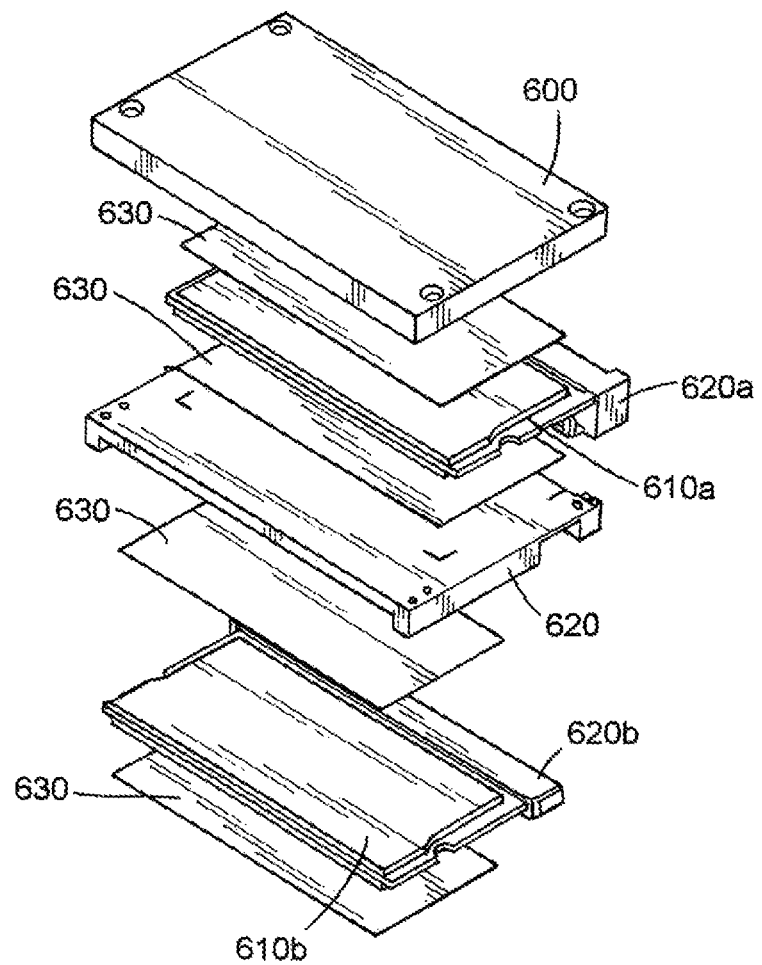
FIG. 12 illustrates the memory socket configuration of FIG. 11 in assembly view, in accordance with the present disclosure.

FIG. 12 illustrates the memory socket configuration of FIG. 11 in assembly view. Module 610a is connected to socket 620a, and module 610b is connected to socket 620b. Device 620 is positioned to securely hold module 610b to a PCB or substrate. Device 600 is positioned to securely hold module 610a to a PCT or substrate. Layers 630 of TIM material are positioned above and below both modules to facilitate heat transfer away from the modules.

Figure 13:
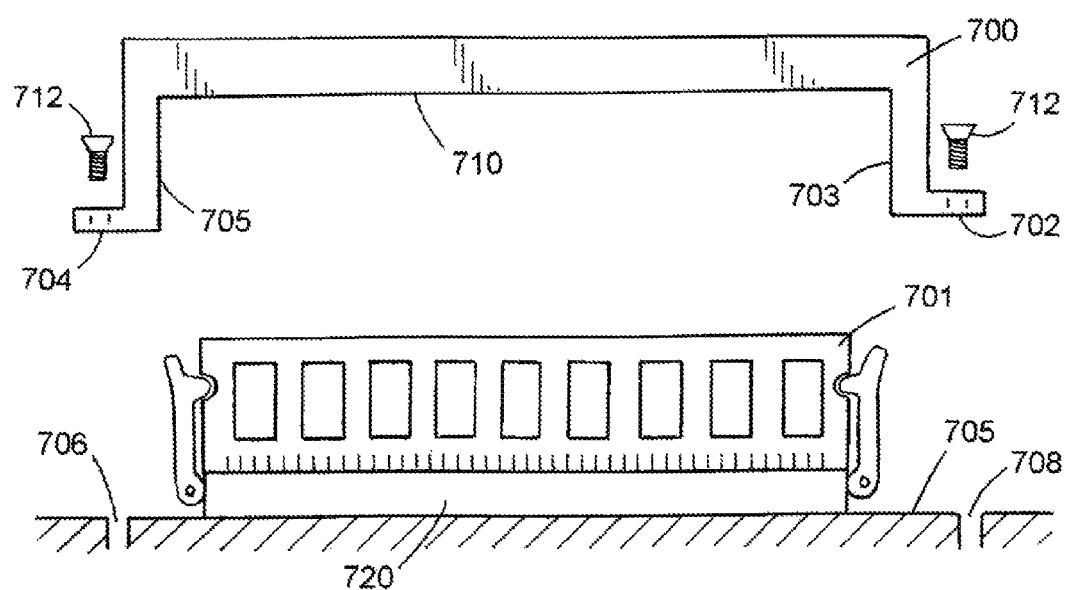
FIG. 13 illustrates an alternative memory socket configuration including alternative memory module, in accordance with the present disclosure.

FIG. 13 illustrates an alternative memory socket configuration including an alternative memory module. Memory modules can include different configurations than SODIMM modules, such as DIMM modules commonly used in desktop computers. DIMM sockets have flip up levers that secure DIMM modules by swinging upward as the module is pushed into the socket. However, these manually activated tabs can similarly dislodge when subjected to shock or heavy vibration. DIMM module 710 is illustrated inserted into DIMM socket 720, with two flip up levers of the socket engaging sides of the DIMM module. Bracket device 700 is illustrated, including surfaces 701, 703, and 705 which engage to module 710 and/or the flip up levers of socket 720 according to similar embodiments of the disclosure to prevent the memory module from disengaging from the socket without the bracket first being removed. Screws 712 are illustrated for attachment of the bracket device 700 to PCB 705 though holes 720 and 704 to threaded screw holes 708 and 706, respectively.

Figure 14:
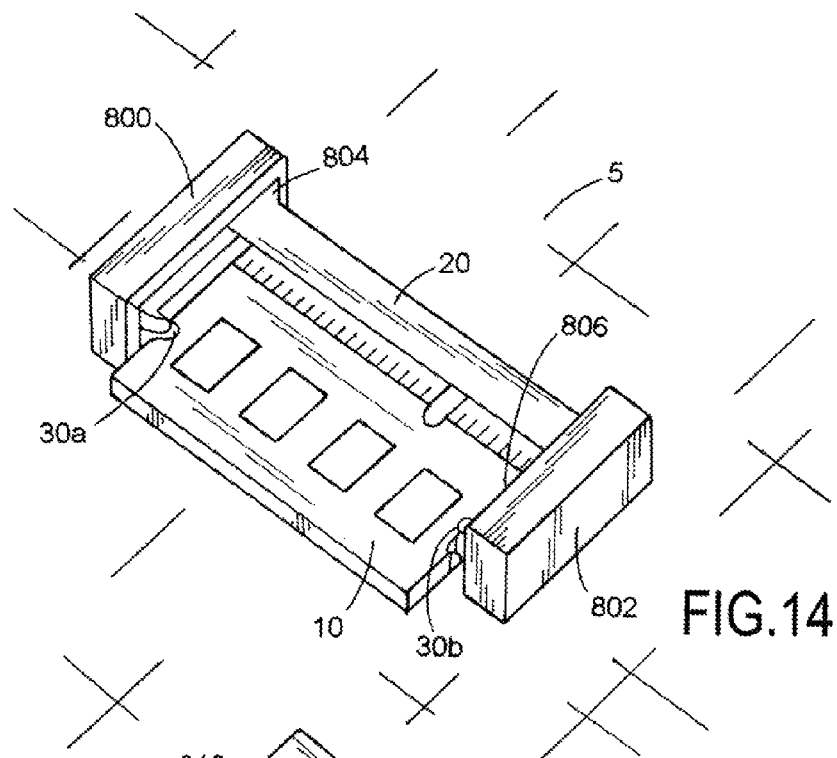
FIG. 14 illustrates an additional alternative embodiment of a securing device including a pair of brackets, each bracket securing one spring clip, in accordance with the present disclosure.

FIG. 14 illustrates an additional alternative embodiment of a securing device including a pair of brackets, each bracket securing one spring clip. Memory module 10 is illustrated engaged to socket 20 which is attached to PCB 5. A securing device embodied as brackets 800 and 802 is illustrated, wherein the brackets each secure and reinforce one of the spring clips 30a and 30b. Brackets 800 and 802 can include cavities 804 and 806, respectively, to locate to features of the socket and spring clips. By securing and immobilizing the spring clips, brackets 800 and 802 secure module 10 and prevent module 10 from being dislodged from socket 20 by shock or vibration.

Figure 15:
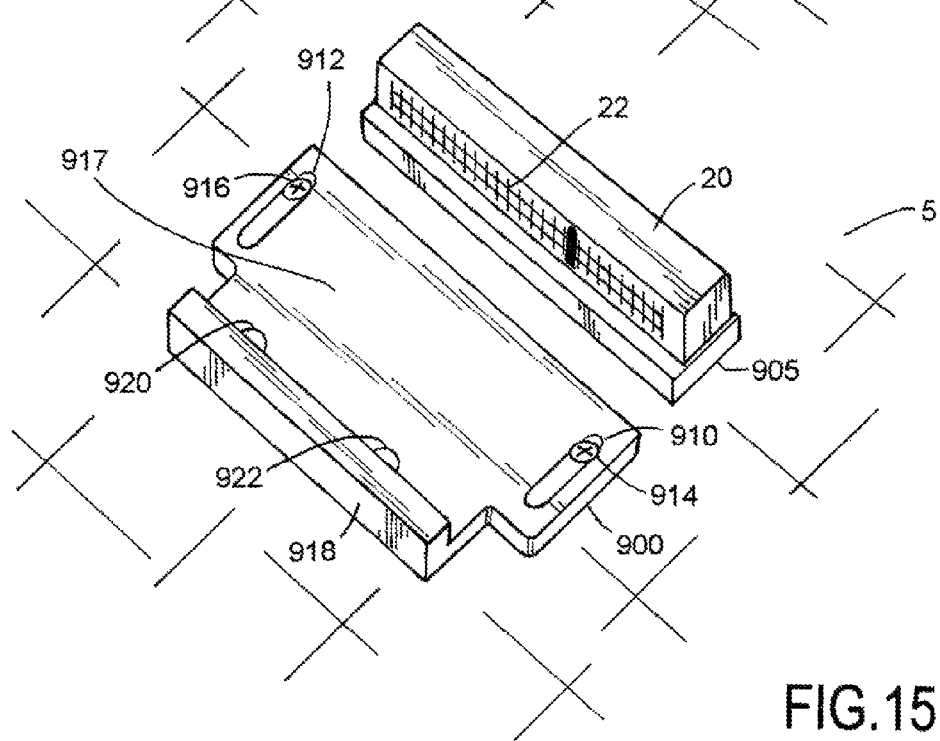
FIG. 15 illustrates an additional alternative embodiment of a securing device including a sliding bracket sitting between a memory module and the circuit board, in accordance with the present disclosure.

FIG. 15 illustrates an additional alternative embodiment of a securing device including a sliding bracket sitting between a memory module and the circuit board. Socket 20 including slot 22 is illustrated. Securing device 900 is illustrated slidingly attached to PCB 5. Device 900 includes slots 910 and 912 with fasteners 914 and 916, respectively, selectively securing a position of device 900 in relation to the PCB board by either permitting or restricting movement of the device by the fasteners sliding through the slots. When a module is placed in slot 22 of socket 20, device 900 can be slid toward socket 20, with wall 918 pressing against the module and with tabs 920 and 922 capturing the module and preventing the module from moving up away from the PCB 5. Flat surface 917 supports the module and prevents the module from moving toward the PCB. Depending upon a height of device 900, a heightened socket or a spacer 905 may have to be used to compensate socket position for any added distance that the memory module is moved away from PCB 5 by device 900 being located under the module. Once the module is in place, fasteners 914 and 916 can be tightened to securely fasten the module in place. In one embodiment, slots 910 and 912 can each have a depression configured to the head of fasteners 914 and 916, such that the bracket can be locked into place with the memory module secured against the socket.

As described in relation to FIG. 9, a memory module can include requirements that nothing contact certain areas of the module. Tabs 920 and 922 can be moved or configured upon the side of device 900 close to slots 910 and 912 for such modules. In future iterations of modules which may have requirements that nothing touch along the sides of the module, tabs such as tabs 920 and 922 can be utilized. The brackets and any affixing features disclosed herein are exemplary and can be adjusted to fit and affix to later iterations of memory modules not yet in service.

Figure 16:
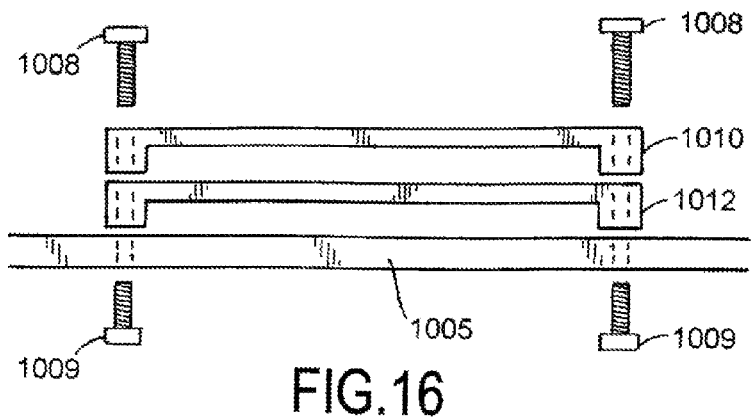
FIGS. 16-19 illustrate various exemplary attachments that can secure a bracket device or devices to a PCB, in accordance with the present disclosure.

FIGS. 16-19 illustrate various exemplary attachments that can secure a bracket device or devices to a PCB. FIG. 16 illustrates a first set of screws fastening a first bracket device to a PCB and a second set of screws fastening a second bracket device to the first bracket device. A first bracket device 1010 and a second bracket device 1012 are illustrated aligned with matching open screw holes on PCB 1005. Screws 1009 can be pushed through the open screw holes on the PCB and threaded into screw holes on device 1012. By tightening screws 1009, bracket 1012 is affixed to PCB 1005. Screws 1008 can be pushed through open screw holes on device 1010 and threaded into screw holes on device 1012. By tightening screws 1008, bracket 1010 is affixed to bracket 1012. By separately attaching each bracket, one memory module can be serviced while the other remains independently affixed to the PCB. In another embodiment, a single longer set of screws could go through both a first device and a second device and attach to an adjacent PCB.

Figure 17:
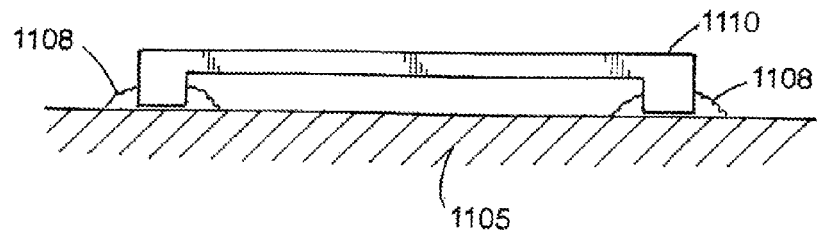

FIG. 17 illustrates an exemplary adhesive affixing a bracket device to a PCB. Bracket device 1110 is illustrated adjacent to PCB 1105. An exemplary epoxy-resin adhesive 1108 is illustrated joining device 1110 to PCB 1105. Any known adhesive that can be used proximately to a circuit board can be used to adhere the device to the PCB. An electrically inert adhesive can be used to avoid any contamination or shorting on the module.

Figure 18:
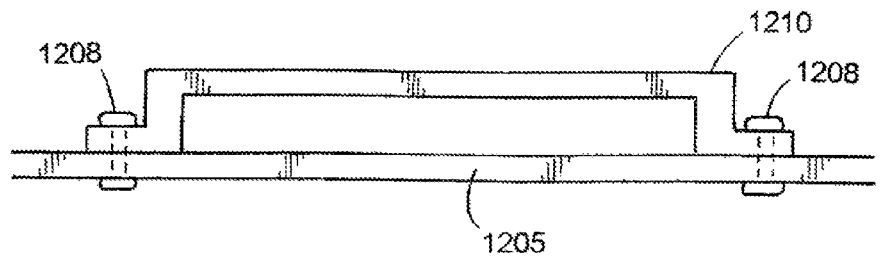

FIG. 18 illustrates an exemplary set of rivets affixing a bracket device to a PCB. Bracket device 1210 is illustrated attached to PCB 1205 with rivets 1208. While rivets are not as easily serviced as a set of screws that can be removed with a screwdriver, rivets still permit a user to use and benefit from a modular SODIMM module instead of soldering chips directly to the board. Additionally, while rivets may be difficult to service in the field, a technician could remove the PCB and remotely pop the rivets before replacing the rivets and reinstalling the PCB to the same or a similar vehicle or application.

Figure 19:
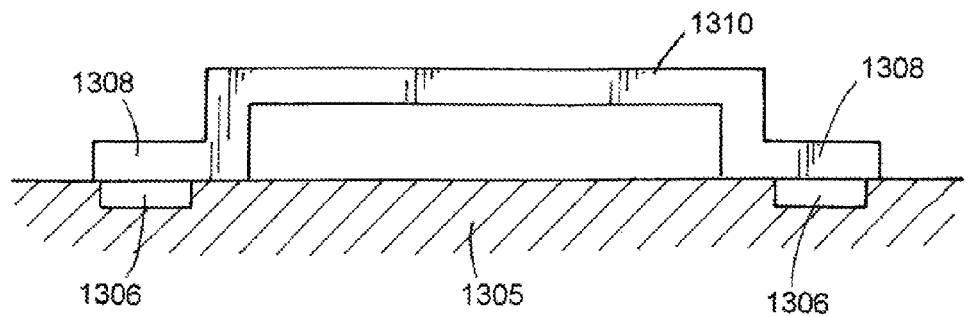

FIG. 19 illustrates an exemplary set of vibration weld joints securing a bracket device constructed of a polymer to a PCB. PCB 1305 is illustrated including a set of plastic plates 1306 affixed to the PCB. Polymer bracket device 1310 is illustrated including connecting areas 1308 located proximately to plates 1306. By joining methods known in the art such as vibration or sonic welding, portions of areas 1308 and plates 1306 melt and are sealed to each other, thereby affixing device 1310 to PCB 1305.

The disclosed device is illustrated securing a SODIMM module to a circuit board. It will be appreciated that the disclosed device could be modified for any number of module or module configurations wherein the module or module is subject to being dislodged from a circuit board by shock, vibration, or other environmental factors. In one embodiment, the disclosed device can include a structure to seal around the module and prevent dust or other contaminants from infiltrating between the module and the proximate socket.

The bracket disclosed herein can be constructed of any known material. In one embodiment, the bracket can be constructed of a material encouraging heat conduction away from the module being fastened. Aluminum, copper, and related alloys are envisioned as being materials used for the bracket. In another embodiment, steel can be used.

In one embodiment, where heat removal is of great concern, the disclosure can be constructed from aluminum with an internal fin cavity, allowing the passage of a cooling liquid to enable the disclosure to both restrain the SODIMM module and provide liquid cooling. In another embodiment, one side of the disclosure can be mated to a SODIMM memory module and the other side to a thermoelectric cooling element that in turn is matched to a larger heat exchanger.

In other embodiments wherein heat conduction is not as critical as other issues, such as cost or weight, one can use plastics or other polymers to construct the bracket. Such a polymer configuration can include holes or vents in the bracket to permit convection of air past the contained module to mitigate any thermal insulation caused by use of the polymer bracket. The examples of materials used to construct the bracket is intended as non-limiting examples of how the device may be constructed.

In one embodiment, the disclosed device comprises a bracket including a feature for securely holding the module, and wherein the device is affixed to the circuit board. In one embodiment, the disclosed device is configured to securely hold the module against a socket configured to electronically connect with the module. The feature can include a module shaped cavity in the bracket. The feature can include a first cavity on a first bracket shaped to a small portion of the module and a second cavity on a second bracket shaped to another small portion of the module, wherein the two brackets together opposingly pinch or otherwise grip the module to keep it in place.

The disclosure has described certain preferred embodiments and modifications of those embodiments. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A system comprising a securing device securing a memory module to a printed circuit board, the system comprising:
the printed circuit board;
the memory module comprising random access memory circuitry;
a memory module socket configured to electronically engage the memory module to the printed circuit board;
a bracket secured directly to the printed circuit board and securely holding the memory module against a memory module socket, the bracket comprising at least one surface in direct contact with the memory module preventing the memory module from moving away from the memory module socket; and
at least one threaded fastener extending through the bracket and the circuit board and affixing the bracket to the circuit board.

2. The system of claim 1, wherein the bracket further comprises heat dissipation fins.

3. The system of claim 1, wherein the bracket device locks spring clips of the memory module socket into place to securely hold the memory module.

4. The system of claim 1, wherein the memory module comprises a small outline dual in-line memory module comprising a rectangular profile including two long sides, one of the long sides comprising electrical pins configured to electronically connect to the memory module socket, and two short sides, each short side comprising a semi-circular locator cut-out; and
wherein the bracket further comprises tabs to grip the semi-circular locator cut-outs formed upon both short sides of the memory module.

5. The system of claim 1, wherein the bracket includes a flat wall to abut against an end of the memory module distal to an end of the memory module that engages to the memory module socket, the flat wall preventing the memory module from accidentally disengaging from the memory module socket.

6. The system of claim 1, wherein the memory module comprises a small outline dual in-line memory module.

7. The system of claim 6, wherein the memory module comprises a rectangular profile including two long sides, one of the long sides comprising electrical pins configured to electronically connect to the memory module socket, and two short sides; and
wherein the bracket is configured to secure a first short side of the memory module; and
further comprising a second bracket configured to secure a second short side of the memory module.

8. The system of claim 1, wherein the bracket device is configured to slide into a first position in which the memory module is held against the memory module socket and into a second position in which the memory module is free to be disengaged.

9. The system of claim 1, further comprising a layer of temperature interface material located between the memory module and the printed circuit board.

10. The system of claim 1, further comprising a layer of temperature interface material located between the memory module and the bracket.

11. The system of claim 1, further comprising a second bracket holding a second memory module against a second memory module socket.

12. The system of claim 11, wherein the second bracket can be removed while the first bracket can remain affixed to the printed circuit board.

13. The system of claim 11, further comprising a layer of temperature interface material located on both flat sides of both memory modules.

14. A system comprising a securing device securing a memory module to a printed circuit board, the system comprising:
the printed circuit board;
the memory module comprising random access memory circuitry;
a memory module socket configured to electronically engage the memory module to the printed circuit board;
a bracket secured directly to the printed circuit board and securely holding the memory module against a memory module socket to prevent the memory module from accidentally disengaging from the memory module socket; and
an affixing agent selected from a rivet, an adhesive, and a thermally formed joint, the affixing agent contacting and securing both the bracket and the circuit board.

15. The system of claim 14, wherein the bracket further comprises heat dissipation fins.

16. The system of claim 14, wherein the bracket device locks spring clips of the memory module socket into place to securely hold the memory module.

17. The system of claim 14, wherein the memory module comprises a small outline dual in-line memory module comprising a rectangular profile including two long sides, one of the long sides comprising electrical pins configured to electronically connect to the memory module socket, and two short sides, each short side comprising a semi-circular locator cut-out; and wherein the bracket further comprises tabs to grip the semi-circular locator cut-outs formed upon both short sides of the memory module.

18. The system of claim 14, wherein the bracket includes a flat wall to abut against an end of the memory module distal to an end of the memory module that engages to the memory module socket, the flat wall preventing the memory module from accidentally disengaging from the memory module socket.

19. The system of claim 14, wherein the memory module comprises a small outline dual in-line memory module comprising a rectangular profile including two long sides, one of the long sides comprising electrical pins configured to electronically connect to the memory module socket, and two short sides; and wherein the bracket is configured to secure a first short side of the memory module; and further comprising a second bracket configured to secure a second short side of the memory module.

20. The system of claim 14, wherein the bracket device is configured to slide into a first position in which the memory module is held against the memory module socket and into a second position in which the memory module is free to be disengaged.

* * * * *